(12) United States Patent
Zeichner et al.

(10) Patent No.: US 11,702,357 B2
(45) Date of Patent: Jul. 18, 2023

(54) NOZZLE STRIP FOR A BLOW BOX FOR THERMALLY PRESTRESSING GLASS PANES

(71) Applicant: SAINT-GOBAIN GLASS FRANCE, Courbevoie (FR)

(72) Inventors: Achim Zeichner, Herzogenrath (DE); Peter Schillings, Eschweiler (DE); Michael Ullrich, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 869 days.

(21) Appl. No.: 16/319,052

(22) PCT Filed: Jun. 26, 2017

(86) PCT No.: PCT/EP2017/065663
§ 371 (c)(1),
(2) Date: Jan. 18, 2019

(87) PCT Pub. No.: WO2018/015108
PCT Pub. Date: Jan. 25, 2018

(65) Prior Publication Data
US 2021/0363049 A1 Nov. 25, 2021

(30) Foreign Application Priority Data
Jul. 21, 2016 (EP) .................................. 16180585

(51) Int. Cl.
*C03B 27/044* (2006.01)
*C03B 27/04* (2006.01)

(52) U.S. Cl.
CPC ........ *C03B 27/0404* (2013.01); *C03B 27/044* (2013.01)

(58) Field of Classification Search
CPC .... C03B 27/0404; C03B 27/044; C03B 27/04
See application file for complete search history.

(56) References Cited

U.S. PATENT DOCUMENTS

| 2,194,760 A | 3/1940 | Long |
| 3,881,906 A * | 5/1975 | Ritter, Jr ............. C03B 23/0252 65/106 |

(Continued)

FOREIGN PATENT DOCUMENTS

| CN | 102143920 A | 8/2011 |
| DE | 710690 C | 9/1941 |

(Continued)

OTHER PUBLICATIONS

International Search Report as issued in International Patent Application No. PCT/EP2017/065663, dated Oct. 19, 2017.

*Primary Examiner* — Galen H Hauth
*Assistant Examiner* — Steven S Lee
(74) *Attorney, Agent, or Firm* — Pillsbury Winthrop Shaw Pittman LLP (57) ABSTRACT

A nozzle strip for a blow box for thermally prestressing glass panes, which nozzle strip has a row of nozzles each having a nozzle inlet and a nozzle opening for impinging on a surface of a glass pane with a stream of air through the nozzle openings, wherein the nozzle openings are arranged on merlon-like elevations of a side surface of the nozzle strip.

18 Claims, 6 Drawing Sheets

(56) References Cited

U.S. PATENT DOCUMENTS

| | | | | |
|---|---|---|---|---|
| 4,142,882 A | * | 3/1979 | Imler | C03B 27/052 65/114 |
| 4,494,972 A | | 1/1985 | Marsh et al. | |
| 4,519,829 A | | 5/1985 | Spittka et al. | |
| 4,662,926 A | | 5/1987 | Aratani et al. | |
| 4,711,655 A | * | 12/1987 | Schultz | C03B 27/0447 65/351 |
| 4,749,401 A | | 6/1988 | Colmon et al. | |
| 5,522,912 A | | 6/1996 | Kobayashi et al. | |
| 5,611,151 A | * | 3/1997 | Jacob | F26B 21/004 34/631 |
| 5,846,281 A | * | 12/1998 | Nikander | C03B 27/0447 65/351 |
| 2008/0127678 A1 | | 6/2008 | Nitschke et al. | |
| 2010/0163653 A1 | * | 7/2010 | Pucciani | B21D 53/06 239/557 |
| 2011/0020611 A1 | | 1/2011 | Ando et al. | |
| 2011/0154862 A1 | * | 6/2011 | Fukami | C03B 27/0404 65/348 |
| 2013/0255319 A1 | * | 10/2013 | Von Der Ohe | C03B 27/0404 65/114 |
| 2021/0403363 A1 | * | 12/2021 | Hurst | C03B 27/0442 |

FOREIGN PATENT DOCUMENTS

| | | | | |
|---|---|---|---|---|
| DE | 808880 C | 7/1951 | | |
| DE | 1056333 B | 4/1959 | | |
| DE | 3612720 C2 | 3/1989 | | |
| DE | 3924402 C1 | 8/1990 | | |
| DE | 692 20 856 T2 | 3/1998 | | |
| DE | 691 28 902 T2 | 8/1998 | | |
| DE | 10 2008 017729 A1 | 10/2009 | | |
| EP | 0 002 055 A1 | 5/1979 | | |
| EP | 0 463 971 A2 | 1/1992 | | |
| EP | 0 719 242 B1 | 12/1998 | | |
| EP | 2 805 926 A1 | 11/2014 | | |
| EP | 3196172 A1 | * | 7/2017 | |
| GB | 505 188 A | 5/1939 | | |
| JP | S58-140331 A | 8/1983 | | |
| JP | H04-231329 A | 8/1992 | | |
| JP | 2003-192366 A | 7/2003 | | |
| JP | 2004067416 A | * | 3/2004 | C03B 27/0404 |
| JP | 2009-274884 A | 11/2009 | | |
| JP | 4835815 B2 | * | 12/2011 | C03B 27/0404 |
| JP | 5445974 B2 | 3/2014 | | |
| WO | WO 03/101898 A1 | 12/2003 | | |
| WO | WO-03101898 A1 | * | 12/2003 | C03B 27/0404 |
| WO | WO 2009/047450 A1 | 4/2009 | | |
| WO | WO 2009/147280 A1 | 12/2009 | | |
| WO | WO 2010/029940 A | 3/2010 | | |
| WO | WO 2010/071178 A1 | 6/2010 | | |
| WO | WO-2010071178 A1 | * | 6/2010 | C03B 27/0404 |
| WO | WO 2016/054482 A1 | 4/2016 | | |

\* cited by examiner

NOZZLE STRIP FOR A BLOW BOX FOR THERMALLY PRESTRESSING GLASS PANES

CROSS-REFERENCE TO RELATED APPLICATIONS

This application is the U.S. National Stage of PCT/EP2017/065663, filed Jun. 26, 2017, which in turn claims priority to European patent application number 16180585.8 filed Jul. 21, 2016. The content of these applications are incorporated herein by reference in their entireties.

The invention relates to a nozzle strip, a blow box equipped therewith, and an apparatus for thermally prestressing glass panes containing it, as well as a prestressing method carried out therewith.

The thermal hardening of glass panes has long been known. It is frequently also referred to as thermal prestressing or tempering. Merely by way of example, reference is made to the patent documents DE 710690 A, DE 808880 B, DE 1056333 A from the 1940s and the 1950s. A glass pane heated to just below softening temperature is impinged on by a stream of air that results in rapid cooling (quenching) of the glass pane. As a result, a characteristic stress profile develops in the glass pane, wherein compressive stresses predominate on the surfaces and tensile stresses in the core of the glass. This influences the mechanical properties of the glass pane in two ways. First, the fracture stability of the pane is increased and it can withstand higher loads than a non-hardened pane. Second, glass breakage after penetration of the central tensile stress zone (perhaps by damage from a sharp stone or by intentional destruction with a sharp emergency hammer) does not occur in the form of large sharp edged shards, but rather in the form of small, blunt fragments, significantly reducing the risk of injury.

Due to the above-described properties, thermally prestressed glass panes are used in the vehicle sector as so-called "single-pane safety glass", in particular as rear windows and side windows. In particular, in the case of passenger cars, the panes are typically bent. The bending and prestressing are done in combination: the pane is softened by heating, brought into the desired bent shape, and then impinged on by the cooling stream of air, thus creating the prestressing. Here, so-called "blow boxes" (quench box, quench head) are used, to which the stream of air is supplied by strong fans. In the blow box, the stream of air is divided into various channels that are in each case completed with a novel strip. The nozzle strips have a side surface with a row of blowing openings or nozzle openings that are aimed at the glass pane and impinge on it with the stream of air distributed by means of the blow box. The bent glass pane is typically transported between an upper and lower blow box; the blow boxes are then brought near each other and near the pane surfaces for prestressing. The entire apparatus with the two blow boxes is frequently referred to as a prestressing station.

Said side surfaces of generally used nozzle strips are, as a whole, flat or curved-flat; the nozzle strips have a substantially cuboid shape or the shape of a curved cuboid. Consequently, the nozzle strips form, so to speak, barriers for outflowing air such that it can primarily flow out efficiently only between the nozzle strips, i.e., parallel to the direction of extension of the nozzle strips, but not transversely to the nozzle strips. In particular, with the prestressing of highly three-dimensionally (spherically) curved panes, this can entail significant disadvantages. The concave surface of such a highly curved pane forms a sort of kettle, as a result of which the outflow of the heated air is possibly hindered in the only remaining outflow direction. This can lead to an air blockage that impedes the cooling of the pane surface and thus reduces prestressing efficiency.

Blow boxes with nozzle strips of the above-described type are, for example, disclosed in DE 3612720 C2, DE 3924402 C1, and WO 2016054482 A1.

Other types of blow boxes or prestressing apparatuses are known, wherein the stream of air is not divided into channels that are completed by nozzle strips. The blow box can, for example, have a hollow space that is completed by a plate that is provided in the manner of a two-dimensional pattern with openings (nozzles), by means of which the stream of air is divided and distributed over the glass pane to be prestressed.

In order to increase prestressing efficiency, it is desirable to enable a more rapid outflow of the heated air. With higher prestressing efficiency, higher stresses can be generated or a given stress profile can be produced using less energy.

Also known are blow boxes that are provided with attached, for example, bolted-on detachable nozzles. Such nozzles have been described both for blow boxes whose hollow space is completed by a nozzle plate and for those in which the gas flow is divided into channels that are completed by a nozzle strip. Reference is made by way of example to U.S. Pat. Nos. 4,519,829 A, 4,711,655 A, EP 0463971 A2, GB 505 188 A, US 2013/255319 A1, U.S. Pat. No. 4,662,926 A, EP 0 719 242 B1, and EP 0 002 055 A1. Such nozzle strips enable, in principle, more rapid cooling since additional outflow channels are also opened through the intermediate spaces between the nozzles transversely to the direction of extension of the nozzle strips. However, the multipart design of nozzle strips and attached nozzles makes production more difficult and reduces the mechanical stability of the blow box system.

The object of the present invention is to provide an improved nozzle strip for blow boxes for thermally prestressing glass panes. The nozzle strip should enable improved prestressing efficiency, in particular in the case of prestressing of highly three-dimensionally bent panes, should have high mechanical stability, and should be simple to produce.

The object is accomplished according to the invention by a nozzle strip according to the independent claim 1. Preferred embodiments emerge from the dependent claims.

The nozzle strip according to the invention for a blow box for thermally prestressing glass panes has a side surface provided with a row of nozzle openings that are provided for impinging on a surface of a glass pane with a stream of air through the nozzle openings. The nozzle openings can also be referred to as blower openings or nozzle outlets. They are in each case the end of a passage or bore extending through the entire nozzle strip, which is referred to as a nozzle and through which a gas is routed from a gas channel (air channel) of the blow box onto the pane surface. The nozzle opening is the output opening of the passage (nozzle), whereas, usually, the input opening (nozzle inlet) is formed on the opposite side surface. Typically, such a nozzle has a tapering section following the input opening and tapering toward the output opening in order to route the air efficiently and in an aerodynamically favorable manner from the air channel into the respective nozzle.

Compared to conventional nozzle strips with a smooth side surface, the nozzle strip according to the invention is advantageously improved in that the nozzle openings are arranged on merlon-like elevations of the side surface.

Alternatively, the nozzle strip according to the invention can be configured to be advantageously improved relative to conventional nozzle strips in that a region of the side surface is set back between respective adjacent nozzle openings.

The nozzle strip is thus implemented with merlons and crenels therebetween (in other words, gaps between the merlons). The nozzle openings are arranged on the top of the merlons. The crenels provide additional outflow channels such that the air heated after blowing onto the pane surface can also flow out transversely to the direction of extension of the nozzle strips, thus improving prestressing efficiency. This is a major advantage of the present invention.

Another advantage of the invention becomes apparent when a close approach of the nozzle strip to the pane is desired, for example, for increasing prestressing efficiency. There is a risk of a collision of the nozzle strip with the pane or the prestressing form on which the pane is arranged. With the nozzle strip according to the invention, the collision points are arranged on the protruding merlon-like elevations, which are easily shortened by removal of material in order to avoid collision.

The nozzle strip according to the invention can also be configured as a nozzle strip with elevated or protruding detachable nozzles arranged on a side surface, which is improved relative to the prior art in that the nozzles are formed integrally with the nozzle strip. This ensures great mechanical stability of the nozzle strip, and the nozzle strip can be produced more easily than in the case of separate bolted-on nozzles.

The nozzle strip preferably has a single row of nozzle openings that are arranged substantially along a line. The merlon-like elevations are arranged along the same line. Preferably, exactly one nozzle opening is arranged on each merlon-like elevation of the side surface of the nozzle strip, typically substantially in the center. The row of nozzle openings preferably extends over at least 80% of the length of the nozzle strip.

The nozzle openings preferably have a diameter of 4 mm to 15 mm, particularly preferably of 5 mm to 10 mm, most particularly preferably of 6 mm to 8 mm, for example, 6 mm or 8 mm. The distance between adjacent nozzle openings is preferably from 10 mm to 50 mm, particularly preferably from 20 mm to 40 mm, for example, 30 mm. Good prestressing results are thus achieved. Here, "distance" refers to the distance between the respective centers of the nozzle openings.

The height of the merlon-like elevations is preferably at least 10 mm, particularly preferably at least 30 mm. The height is preferably from 10 mm to 150 mm, particularly preferably from 30 mm to 100 mm, for example, 40 mm or 60. This ensures efficient outflow of heated air between the merlons and, at the same time, sufficient stability of the nozzles. In the context of the invention, "height" of the merlon-like elevation refers to the dimension along the direction of extension of the nozzle.

The diameter of the nozzle openings should be taken into account in the selection of the width of the elevations such that sufficient wall thickness of the nozzles is ensured. The wall thickness should be at least 1.5 mm in order to achieve sufficient stability of the elevation. Consequently, the width of the merlon-like elevations preferably has a value that corresponds to the diameter of the nozzle opening plus 3 mm. The width of the merlon-like elevation is, for example, from 10 mm to 30 mm or even from 12 mm to 22 mm. In the context of the invention, "width" of the merlon-like elevation refers to the dimension along the direction of extension of the row of nozzles (succession of nozzle openings).

The distance between adjacent merlon-like elevations is preferably at least 5 mm, particularly preferably at least 10 mm. The distance is preferably from 5 mm to 30 mm, particularly preferably from 10 mm to 20 mm. This ensures efficient outflow of heated air. Here, the distance means the distance between side edges of the merlons facing one another. I.e., the distance corresponds, as it were, to the width of the crenels.

The depth of the merlon-like elevation preferably corresponds to the width or depth of the nozzle strip, but can, in principle, also be selected larger or smaller. Like the width, with the depth of the elevations, the minimum wall thickness must be taken into account. The depth of the merlon-like elevations preferably has a value that corresponds to the diameter of the nozzle opening plus 3 mm. The depth is the dimension perpendicular to the height and width of the merlons defined according to the invention.

The length and width of the nozzle strip is governed by the design of the blow box or its gas channels, for which the nozzle strip is provided. Typical values for the length of the nozzle strip (measured along the direction of extension of the row of nozzles) are from 70 cm to 150 cm and for the width/depth (measured perpendicular to the length in the plane of the nozzle openings), from 8 cm to 15 cm, preferably from 10 to 12 mm. The number of nozzle openings is determined by the length of the nozzle strip and the mutual spacing of the nozzles.

The individual merlon-like elevations have, in a preferred embodiment, a substantially cuboid shape, wherein the corners and edges can be rounded for production engineering reasons or by intentional design. Such a shape is simple to produce and stable. However, in principle, different shapes can also be realized, for example, the shape of a circular cylinder or a truncated cone or truncated pyramid.

In another preferred embodiment, the merlon-like elevations are at least curved and have no straight sections, yielding a wave-like profile when viewed from the side. The nozzle openings are arranged on the wave peaks, more precisely, the wave crests, whereas the crenels are substantially defined by the wave troughs. In other words, the surface of the nozzle strip is curved with the nozzle openings and has no planar sections or subsurfaces. This shape of the merlon-like elevations is simple to manufacture and avoids the occurrence of edges in the crenels, in which glass splinters from damaged or broken glass panes can jam or snag. The cleaning of the nozzle strips after glass breakage is thus significantly facilitated. In this case, the distance between the connecting line of the wave lengths and the connecting line of the deepest points of the wave troughs is indicated as the height of the merlon-like elevation. The width of the merlons and the distance between the merlons can be measured as approx. half of the height of the merlons. The nozzle strip shape described should appear at least in sections/regions, wherein this section/region preferably corresponds to at least 80% of the nozzle strip. Ideally, the entire nozzle strip is designed in the curved shape, with the two end merlons possibly constituting exceptions, for example, if the side surfaces of the end merlons, which face away from the other merlons, are implemented planar for production engineering reasons.

The nozzle strip preferably contains aluminum or steel and is preferably made of said materials. These materials are readily worked such that the nozzle strip can be produced advantageously and they result in advantageous stability of the nozzle strip in long-term use.

The production of the nozzle strip can be done starting from a cuboid workpiece or a workpiece in the shape of a curved cuboid. The merlon-like structure is formed by removing material on one side edge. Depressions can be formed by removing material on the opposite side edge, preferably by means of a countersink, in particular a conical countersink, which yield the tapering sections of the nozzles. The nozzles can be formed by drill bores before, after, or between the work steps described. The nozzle inlet, the transition between the tapering depressions and the drill bore, or the nozzle opening can be deburred to enable an improved flow profile. The removal of material is preferably done by laser cutting or water jet cutting.

The invention also includes a blow box equipped with at least one nozzle strip according to the invention. The blow box is used to impinge on the surface of a glass pane for thermal prestressing. The blow box is an apparatus with an inner hollow space and has a gas feed line, via which a stream of gas can be routed into the interior of the blow box. The stream of gas is typically generated by a fan or a plurality of fans connected in series. Preferably, the gas feed line can be closed, for example, by means of a slider or a flap such that the stream of gas into the inner hollow space can be interrupted without having to turn off the fans themselves.

Opposite the gas feed line, a plurality of channels, into which the stream of gas is divided during operation, connect to the inner hollow space. The channels can also be referred to as nozzle webs, fins, or ribs. The channels typically have an elongated, substantially rectangular cross-section, wherein the longer dimension substantially corresponds to the width of the hollow space and the shorter dimension is within the range from 8 cm to 15 cm. Typically, the channels are arranged parallel to one another such that they are uniformly distributed over the entire side boundary of the hollow space. The number of channels is typically from 10 to 50.

The inner hollow space is wedge-shaped in a preferred embodiment. The boundary of the hollow space adjacent the channels can be described as two side surfaces that converge in an acute angle. The channels typically run perpendicular to the connecting line of said side surface. Consequently, the length of a channel is not constant, but, instead, increases from the center toward the sides such that the inlet opening of the channel connected to the hollow space is wedge-shaped and spans the outlet opening in a smooth, typically curved surface. The outlet opening of all channels typically forms a common smooth, curved surface. By means of the wedge-shaped design of the hollow space described, the stream of gas is particularly efficiently divided into the channels, and the result is a stream of gas very homogeneous over the entire active area.

Each channel is completed on its end opposite the hollow space with a nozzle strip. The nozzle strip has a plurality of passages that are referred to as nozzles and by which the stream of gas of each channel is again divided. At least one of the channels, preferably all channels, are equipped with a nozzle strip according to the invention with merlon-like elevations.

The channels are typically formed from metal sheets and completed by the nozzle strip. The side metal sheets preferably have a straight side edge at the channel outlet. The channel is completed by the lower portion of the nozzle strip, opposite the side surface with the nozzle outlets on the merlon-like elevations. The metal sheets are not raised all the way to the merlon-like elevations. Such metal sheets are simpler to produce and use less material. Also, the free space for outflowing gas is increased by the fact that no metal sheet is arranged in the intermediate space between the merlon-like elevations of adjacent nozzle strips.

The nozzle strips are preferably designed and mounted such that the merlon-like elevations of adjacent nozzle strips are arranged offset. Each elevation is thus arranged adjacent the "crenels" of the two adjacent nozzle strips.

The blow box thus divides the stream of gas from the gas feed line with a comparatively small cross-section over the channels and nozzles over large active area. The nozzle openings constitute discrete gas outlet points that are nevertheless present in large numbers and uniformly distributed such that all regions of the surface are cooled substantially simultaneously and uniformly such that the pane is provided with homogeneous prestressing.

At least one nozzle strip of the blow box according to the invention is a nozzle strip according to the invention with the merlon-like elevations. Preferably, the majority of the nozzle strips is implemented according to the invention; particularly preferably, all of the nozzle strips. Then, the advantages are particularly evident.

The spacing of adjacent nozzle strips (measured from their respective centers) is preferably from 15 mm to 50 mm.

The invention also includes an apparatus for thermally prestressing glass panes. The apparatus comprises a first blow box and a second blow box, which are arranged opposite one another, such that their nozzles point toward one another. The blow boxes are spaced apart such that a glass pane can be arranged between them. Typically, the nozzles of the first blow box (upper blow box) point downward, in particular vertically downward, and the nozzles of the second blow box (lower blow box) point upward, in particular vertically upward. Then, a glass pane can advantageously be moved in a horizontal position between the blow boxes.

The apparatus preferably also includes means for changing the distance between a first and a second blow box. Thus, the blow boxes can be moved relatively toward and away from one another. Preferably, both blow boxes are moved simultaneously toward or away from one another. By means of the movable blow boxes, prestressing efficiency can be increased. After the glass pane has been moved between the blow boxes when they are are farther apart, the distance between the blow boxes relative to one another and, consequently, relative to the glass pane is reduced, by which means a stronger stream of gas on the glass surface can be produced.

The apparatus also includes means for moving a glass pane that are suitable for moving a glass pane into the intermediate space between the two blow boxes and out of the intermediate space again. A rail, roller, or conveyor belt system can, for example, be used for this purpose. The glass pane can optionally be mounted on a frame form during transport.

The design of the blow boxes and their gas channels and nozzle strips is preferably adapted to the shape of the pane to be prestressed. The nozzle openings of one blow box span a convexly curved area and the nozzle openings of the opposite blow box span a concavely curved area. The degree of curvature is also governed by the shape of the pane. During prestressing, the convex blow box faces the concave surface of the pane and the concave blow box faces the convex surface. Thus, the nozzle openings can be positioned closer to the glass surface, increasing prestressing efficiency. Since the panes are customarily transported to the prestressing station with the concave surface facing upward, the upper blow box is preferably convex and the lower blow box is concave.

The invention also includes an arrangement for thermally prestressing glass panes, comprising the apparatus according to the invention and a glass pane arranged between the two blow boxes.

The invention also includes a method for thermally prestressing glass panes, wherein (a) a heated glass pane to be prestressed, having two primary surfaces and a peripheral side edge, is arranged areally between a first blow box and a second blow box such that the two primary surfaces can be impinged on by a stream of gas, wherein the first blow box and/or the second blow box is equipped with at least one nozzle strip according to the invention; (b) the two primary surfaces of the glass pane are impinged on with a stream of gas by the two blow boxes such that the glass pane is cooled.

Preferably, at least one blow box or even both blow boxes are predominantly or exclusively equipped with nozzle strips according to the invention.

The glass pane is preferably transported on rollers, rails, or a conveyor belt between the blow boxes. In an advantageous embodiment, the glass pane is arranged for this on a form with a frame-like support surface (frame form).

Preferably, the blow boxes are brought closer to one another after the glass pane has been arranged between them. Thus, the distance from the nozzle openings to the pane surface is shortened and prestressing efficiency is increased.

The impingement of the pane surfaces with the stream of gas is done in that a stream of gas is introduced into the inner hollow space of each blow box, divided there, and is routed via the nozzle openings uniformly distributed onto the pane surfaces.

The gas used for cooling the glass pane is preferably air. To increase prestressing efficiency, the air can be actively cooled within the prestressing apparatus. Typically, however, air is used that is not specially temperature controlled by active measures.

The pane surfaces are are preferably impinged on by the stream of gas over a period from 1 s to 10 s.

The glass pane to be prestressed is made, in a preferred embodiment, of soda lime glass, as is customary for window panes. The glass pane can, however, also contain or be made of other types of glass such as borosilicate glass or quartz glass. The thickness of the glass pane is typically from 0.2 mm to 10 mm, preferably 0.5 mm to 5 mm.

In an advantageous embodiment, the method according to the invention immediately follows a bending process in which the glass pane, flat in the initial state, is bent. During the bending process, the glass pane is heated to softening temperature. The prestressing process follows the bending process before the glass pane is significantly cooled. Thus, the glass pane does not have to be heated again specifically for prestressing.

Bent, prestressed panes are common, in particular, in the vehicle sector. The glass pane to be prestressed according the invention is, consequently, preferably intended as a window pane of a vehicle, particularly preferably a motor vehicle, and in particular a passenger car.

The nozzle strip according to the invention opens additional outflow channels for air streamed onto the surface through the regions between the merlon-like elevations. This advantage is useful in particular during the prestressing of glass panes that are highly curved in the direction perpendicular to the direction of extension of the nozzle strips such that the nozzle strips can constitute potential barriers for outflowing air. This occurs in particular with panes that are highly curved in two spatial directions (so-called "three-dimensional bending" or "spherical bending") with a high bending depth. Such highly bent panes form a sort of kettle, such that gas can flow less well, in particular in the case of use of conventional cuboid nozzle strips, which constitute additional barriers for outflowing gas. Consequently, in a particularly advantageous embodiment, the method according to the invention is applied to such a highly curved glass pane, wherein at least that blow box that is aimed at the concave pane is equipped with the nozzle strip according to the invention. The glass pane preferably has, in the direction of curvature perpendicular to the direction of extension of the nozzle strips, a bending gradient BG of at least 5, preferably at least 8, particularly preferably at least 10. Here, the bending gradient is defined as $$BG = \frac{100 \times KT}{0.5 \times SL},$$

where SL is the so-called chord length, namely the length of the path between the centers of the side edges in the direction considered and KT is the depth of curvature, namely the vertical distance of the geometric center of the pane from said chord. The person skilled in the art is familiar with the expressions "chord length" and "depth of curvature". It has been shown that starting from the bending gradient mentioned, a significant kettle effect occurs and the invention demonstrates its advantages in a special way. Since nozzle strips are usually arranged parallel to the upper and lower edge of the glass pane, which is usually the longer expansive dimension of the pane, the above-described minimum curvature preferably applies to the the vertical direction of curvature, in other words, the direction of curvature between the upper edge and the lower edge. The "upper edge" is that side edge of the pane that is intended to point upward toward the vehicle roof, whereas the "lower edge" points downward. An alternative bending gradient can also be defined as $$BG' = \frac{100 \times KT}{SL}.$$

Glass panes must have a minimum thickness in order to be thermally prestressed since the difference in the cooling speed between the surfaces of the pane and the core of the pane is critical for the formation of the characteristic profile of compressive and tensile stresses. With conventional blow boxes, panes starting from a minimum thickness of approx. 3 mm can be thermally prestressed. The improved prestressing efficiency due to the nozzle strips according to the invention can support efforts to thermally prestress even thinner panes. Thus, with the method according to the invention, even glass panes with a thickness less than 3 mm can be prestressed.

The nozzle strip can, in particular with small distances, be adapted to the pane geometry, by shortening interfering nozzles. Thus, the nozzle strip can be moved, for example, in a test stand, into the desired distance from a glass pane and merlon-like elevations that collide with the glass pane or the support form carrying it can be shortened by removal of material to avoid the collision.

The invention also includes the use of a glass pane prestressed with the method according to the invention in means of transport for travel on land, in the air, or on water, preferably as a window pane in rail vehicles or motor vehicles, in particular as a rear window, side window, or roof panel of passenger cars.

The invention is explained in detail in the following with reference to drawings and exemplary embodiments. The drawings are schematic representations and not true to scale. The drawings in no way restrict the invention.

They depict.

Figure 1:
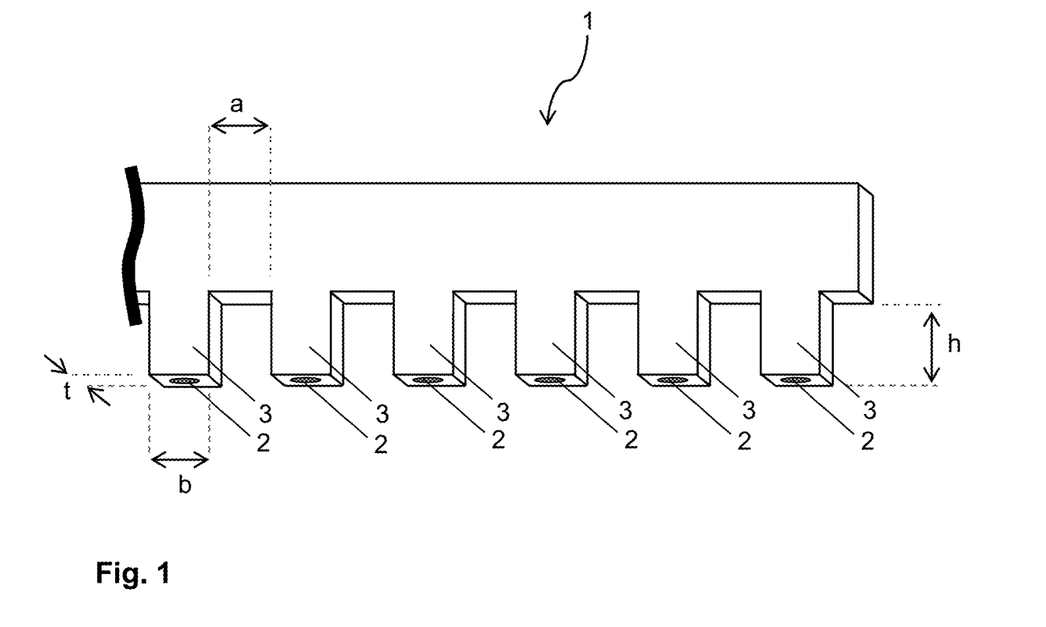
FIG. 1 a perspective view of a nozzle strip according to the invention.
Figure 2:
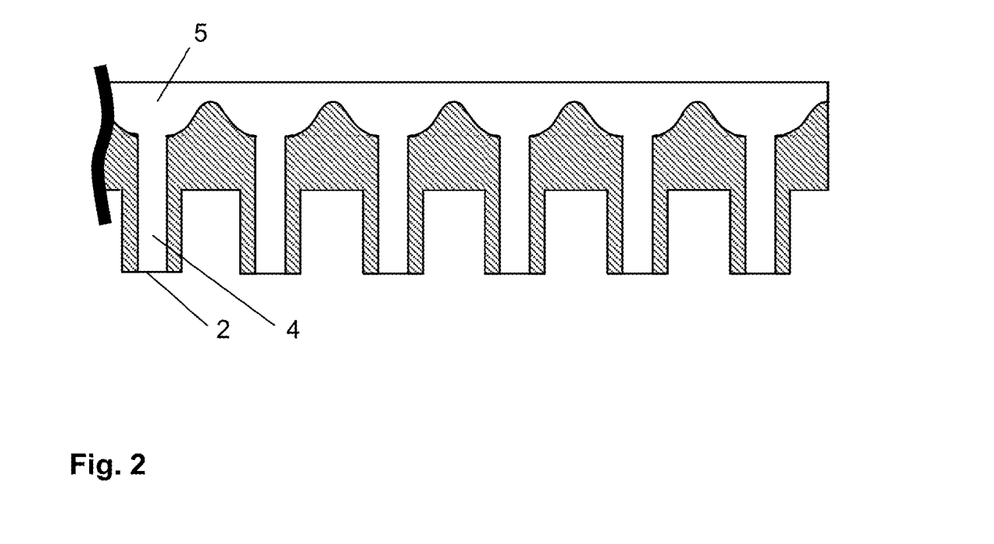
FIG. 2 a cross-section through the nozzle strip of FIG. 1.

FIG. 1 and FIG. 2 each depict a detail of an embodiment of the nozzle strip 1 according to the invention for a blow box for thermally prestressing glass panes. The nozzle strip 1 is made of aluminum, which can be readily processed, and has advantageously low weight. The nozzle strip has, for example, a width of 11 mm, with the dimensions coordinated to complete the gas channels of an associated blow box. As is usual with generic nozzle strips, the nozzle strip 1 according to the invention is implemented with a row of nozzles 4. Each nozzle 4 is a passage (bore) between two opposite side surfaces of the nozzle strip 1. The nozzles 4 are provided to route a stream of gas out of the associated blow box, with the stream of gas entering via a nozzle inlet 5 into the nozzle 4 and exiting via a nozzle opening 2 from the nozzle 4. Consequently, the side surface of the nozzle strip 1 with the nozzle inlets 5 must face the blow box in the installed position, whereas the side surface with the nozzle openings 2 faces away from the blow box.

According to the invention, the side edge of the nozzle strip 1, on which the nozzle openings 2 are arranged, is implemented with merlon-like elevations 3, with each nozzle opening 2 arranged in each case on such an elevation 3. The advantage of this arrangement consists in that outflow channels are formed by the regions between adjacent merlons (the "crenels"). Gas that was routed onto the surface of a glass pane for thermal prestressing, flows out better and quicker through these outflow channels, thus accelerating the heat transport. The cooling of the glass surface is done faster such that prestressing efficiency is increased. This increased prestressing efficiency can, for its part, be exploited in two different ways.

Predefined stress values can be achieved with lower flows of gas such that the prestressing process can be carried out with lower energy consumption.

Higher stress values can be realized in the glass pane with a given stream of gas and, in particular, thinner glass panes can also be thermally prestressed.

These advantages are evident in particular with panes highly bent in two spatial directions (three-dimensionally bent, spherically bent), with which the gas outflow is impeded due to their kettle shape.

The remaining side surfaces of the nozzle strip 1 are smooth-flat.

The geometric dimensions of the exemplary embodiment are summarized below. They are, however, to be construed only by way of example and are in no way intended to limit the invention.

The merlon-like elevations 3 have a width b of 15 mm, a height h of 40 mm, and a depth t of 11 cm, wherein the depth t corresponds substantially to the width of the nozzle strip 1. The distance a between adjacent elevations 3 is 15 mm. The distance between the centers of adjacent nozzle openings 2 is 30 mm.

The individual nozzles have a greatly widened nozzle inlet 5, followed by a tapered section. After that, the diameter of the nozzle remains constant at 6 mm all the way to the nozzle opening 2.

Figure 3:
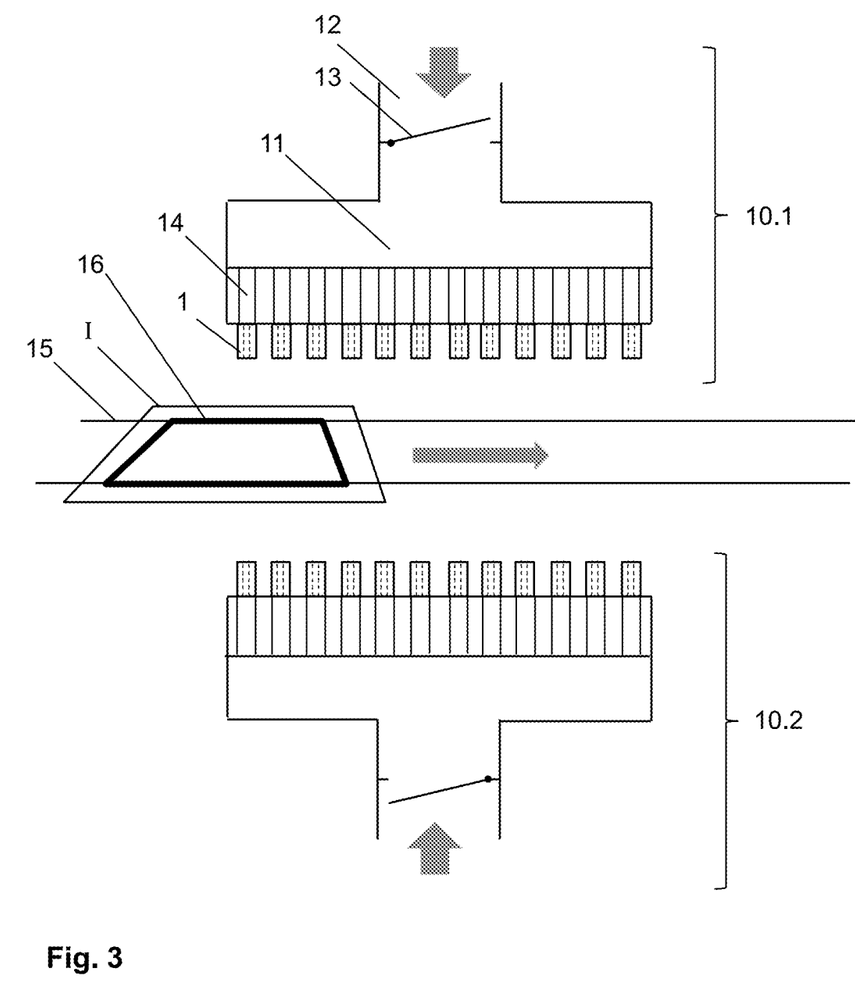
FIG. 3 a cross-section through two blow boxes according to the invention as part of an apparatus for thermal prestressing, FIG. 4 another cross-section through the apparatus of FIG. 3, rotated by 90°, FIG. 5 a plan view of the nozzle strips of a blow box according to the invention, FIG. 6 a flowchart of an embodiment of the method according to the invention, FIG. 7 a side view of another embodiment of a nozzle strip according to the invention, and FIG. 8 an illustration of the bending gradient BG.
Figure 4:
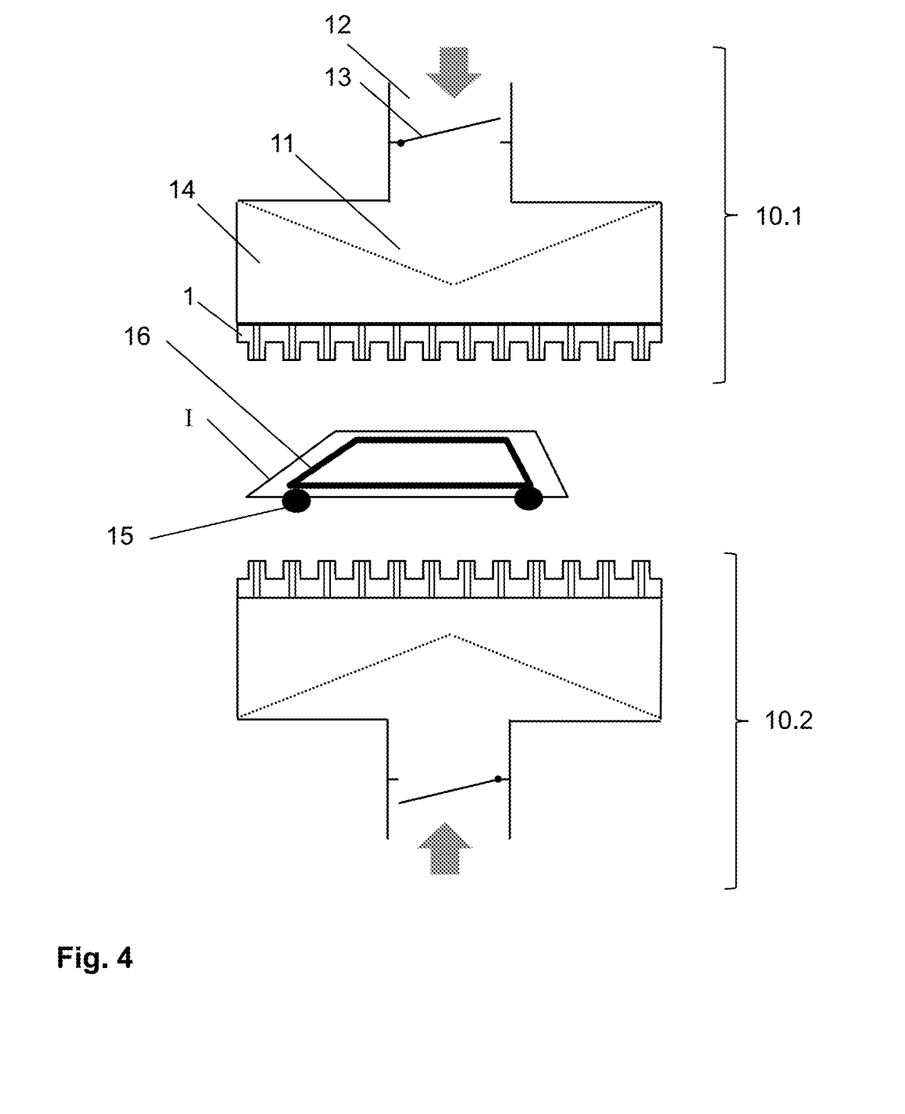

FIG. 3 and FIG. 4 depict an embodiment of the apparatus according to the invention for thermally prestressing glass panes. The apparatus includes a first, upper blow box 10.1 and a second, lower blow box 10.2 that are arranged opposite each other such that the nozzle openings 2 face each other. The apparatus further comprises a transport system 15, with which a glass pane I to be prestressed can be transported between the blow boxes 10.1 and 10.2. The glass pane I is mounted horizontally on a frame form 16, which has a frame-like support surface, on which a peripheral edge region of glass pane I is placed. The actual transport apparatus 15 consists, for example, of rails or a roller system, on which the frame form 16 is movably mounted. The glass pane I is, for example, a pane made of soda lime glass that is provided as a rear window for a passenger car. The glass pane I has passed through a bending process, wherein it was brought, at a temperature of approx. 650° C., for example, by means of gravity bending or press bending into the intended, curved shape. The transport system 15 serves to transport the glass pane I in the still heated state from the bending apparatus to the prestressing apparatus. There, the two primary surfaces are impinged on by the blow boxes 10.1 and 10.2 with a stream of air, in order to cool them greatly and to thus produce a characteristic profile of mechanical tensile and compressive stresses. The thermally prestressed glass pane I is then suitable, as so-called "single-pane safety glass", for use as an automobile rear window. After prestressing, the pane is again transported by the transport system 15 out of the intermediate space between the blow boxes 10.1 and 10.2, as result of which the prestressing apparatus is available for prestressing the next glass pane. The apparatus also has means for moving the blow boxes 10.1 and 10.2 toward each other and away from each other. As soon as the glass pane I has reached its prescribed position between the blow boxes 10.1 and 10.2, the distance of the blow boxes 10.1 and 10.2 from each other and from the pane surfaces is reduced in order to obtain a greater cooling effect by means of the stream of air. After prestressing, the distance is again increased in order to be able to transport the glass pane I away without damage to the pane itself or to the nozzle strips 1. The transport direction of the glass pane I is represented in FIG. 3 by a gray arrow.

The blow boxes 10.1 and 10.2 are blow boxes of the type described, for example, in DE 3924402 C1 or WO 2016054482 A1. They have an inner hollow space 11, to which a stream of air is routed via a gas feed line 12, which stream of air is represented in the figures by a gray arrow. The stream of air is produced, for example, by two fans connected in series (not shown) that are joined via the gas feed line 12 to the blow box 10.1 or 10.2. The stream of air can be interrupted by a closing flap 13 without having to turn off the fans.

Opposite the gas feed line 12, channels 14, by which the stream of air is divided into a series of substreams, are connected to the hollow space 11. The channels 14 are formed like a hollow rib that is substantially as long in one dimension as the hollow space 11 and has in the dimension perpendicular thereto a very small width, for example, approx. 11 mm. The channels 14 with their elongated cross-section are arranged parallel to one another such that the endpoints of all channels lie substantially in one straight line that runs perpendicular to the direction of extension of the elongated channels. The number of channels 14 depicted is not representative and merely serves to illustrate the operating principle.

The hollow space 11 is wedge-like—along a first dimension, the depth of the hollow space 11 is greatest in the center of the blow box and decreases outward in both directions. In the second dimension perpendicular thereto, the depth remains constant in each case at a given position of the first dimension. The channels 14 are connected along said first dimension to the wedge-shaped hollow space 11. Consequently, they have a depth profile complementary to the wedge shape of the hollow space 11, the depth being its least in the center of the channel 14 and increasing toward the outside such that the air outflow of each channel 14 forms in a smooth, but typically curved area. The air outlets of all channels 14 form a common smooth surface.

FIG. 3 and FIG. 4 depict two cross-sections at an angle of 90° relative to one another. FIG. 3 depicts the cross-section along said second dimension of the blow box 10.1, 10.2 transverse to the orientation of the channels 14 such that the individual channels 14 are discernible in section. The depth of the hollow space 11 is constant in the sectional plane. FIG. 4 depicts the cross-section along said first dimension of the blow box 10.1, 10.2 along the orientation of the channels 14. Here, the wedge-like depth profile of the hollow space 11 is discernible, whereas in the sectional plane only one individual channel 14, whose depth profile is also discernible, lies in the sectional plane.

Each channel 14 is completed on its end opposite the hollow space by a nozzle strip 1 according to the invention. By means of the nozzle strip 1, the stream of air of each channel 14 is again divided into further substreams, which are, in each case, routed through a nozzle 4. Each substream enters the nozzle 4 through the nozzle inlet 5 out of the channel 14, out of the nozzle opening 2 out of the nozzle 4, and then strikes the surface of the glass pane I.

Figure 5:
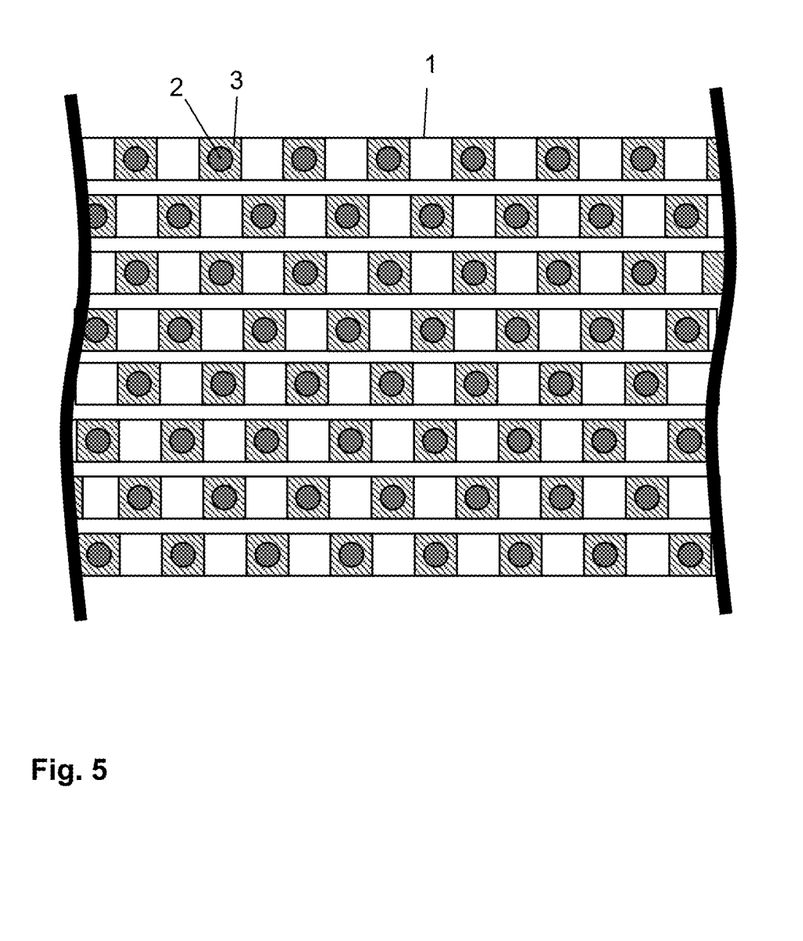

FIG. 5 depicts a detail of a plan view of nozzle openings 2 of the blow box 10.1, 10.2. The number of nozzle strips 1 is again not representative and merely serves for illustration. It is discernible that the adjacent nozzle strips 1 are offset relative to one another such that a merlon-like elevation 3 of one nozzle strip 1 is in each case arranged adjacent a "crenel" of the two adjacent nozzle strips 1. As a result of this arrangement, the most uniform distribution of the nozzle openings 2 possible is obtained.

Figure 6:
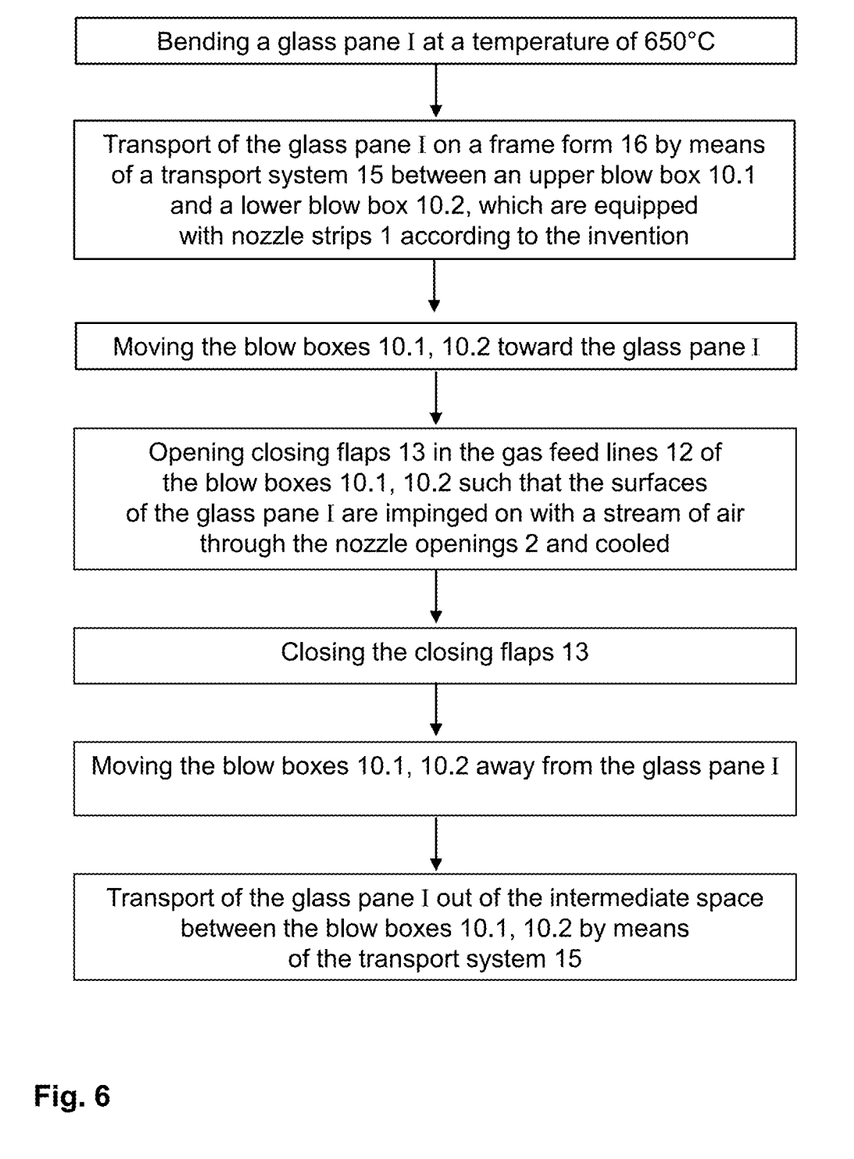

FIG. 6 depicts an exemplary embodiment of the method according to the invention for thermally prestressing glass panes using a flowchart.

Figure 7:
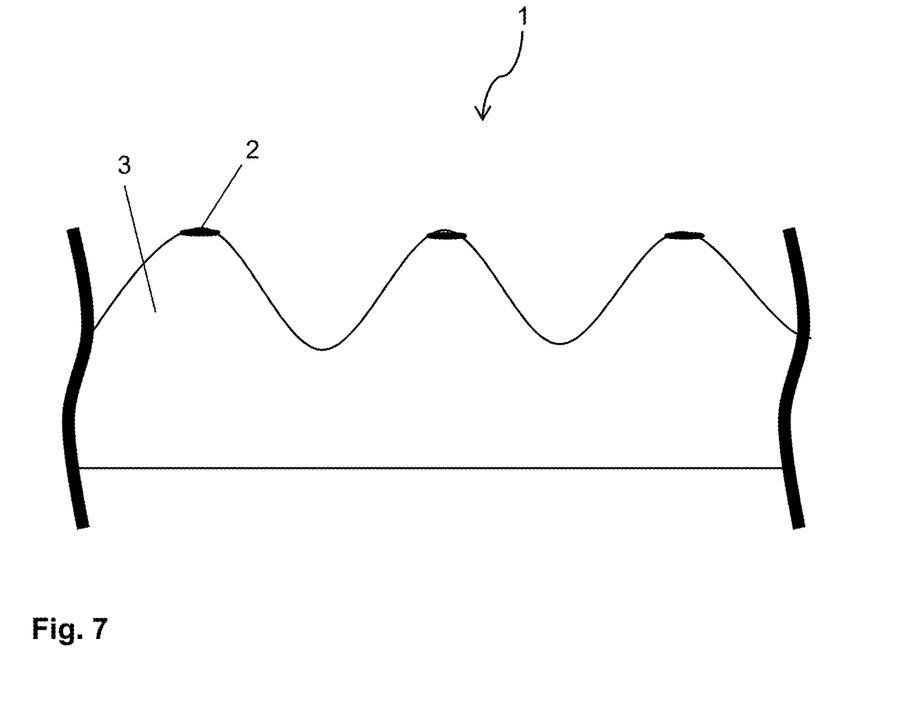

FIG. 7 depicts another embodiment nozzle strip 1 according to the invention. The merlon-like elevations 3 are not cuboid here. Instead, the surface of the nozzle strip 1 with the nozzle openings 2 is curved. In the side view of the nozzle strip shown (i.e., the plan view of the surface that connects the surface having the nozzle openings 2 to the opposite surface and is arranged along the long dimension of the nozzle strip 1), there is a wave profile with convex wave peaks and concave wave troughs. The nozzle openings 2 are arranged on the wave peaks. Since the surface having the nozzle openings 2 has no planar sections, no edges form between the merlon-like elevations 3 in which glass splinters can be snagged. Consequently, after glass breakage, this nozzle strip 1 is easier to clean.

Figure 8:
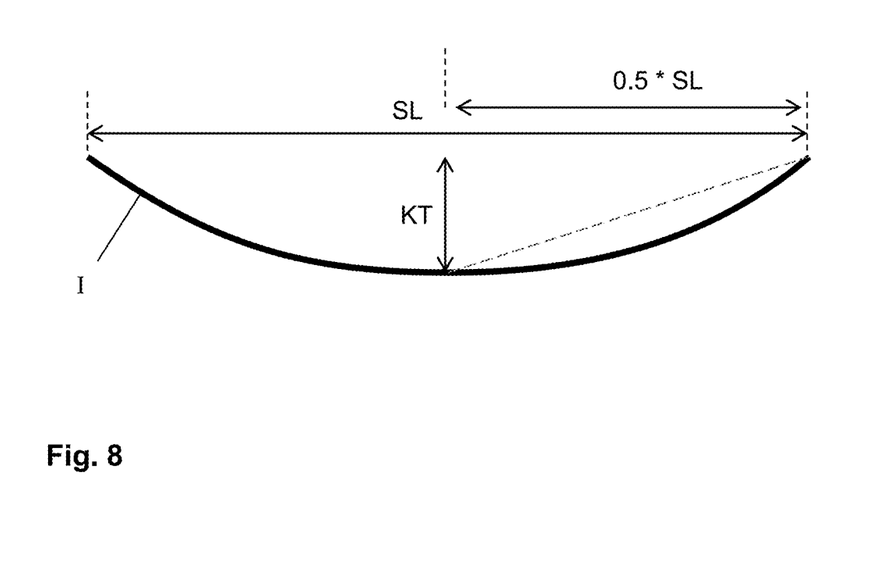

FIG. 8 illustrates the bending gradient BG using a schematic cross-section through a glass pane I. The bending gradient BG describes the extent of bending of the glass pane. The bending gradient is defined as $$BG = \frac{100 \times KT}{0.5 \times SL}.$$

The chord length SL denotes the length of the path between the centers of the side edges in the direction considered. The depth of curvature KT denotes the vertical distance of the geometric center of the pane from said path. The bending gradient BG ultimately indicates the slope of the straight line through the geometric center of the pane and the center of the side edge, which is indicated by a dashed line in the figure. The greater the bending gradient BG, the more kettle-like the glass pane I and the more advantageously the effect of the present invention, namely the improved efficiency through the provision of additional air outflow channels, becomes apparent.

EXAMPLE

Rear windows with a vertical bending gradient greater than 8 and a horizontal bending gradient greater than 4 were prestressed with a blow box according to the invention and a prior art blow box with cuboid nozzles strips. With the same distances of the glass pane from the blow boxes, the speed of the fans and, thus the flow speed of the stream of air were controlled such that the same fracture pattern was produced with the nozzle strip according to the invention as with the prior art. The fracture pattern is characterized by the number and size of fragments upon breakage of the glass pane and is a measure of the degree of prestressing achieved. It was found that the nozzle strip according to the invention enabled energy savings greater than 5%. This result was unexpected and surprising for the person skilled in the art.

LIST OF REFERENCE CHARACTERS (1) nozzle strip
(2) nozzle opening/outlet opening of the nozzle 4
(3) merlon-like elevation of the nozzle strip 1
(4) nozzle
(5) nozzle inlet/inlet opening of the nozzle 4
(10.1) first/upper blow box
(10.2) second/lower blow box
(11) hollow space of the blow box 10
(12) gas feed line of the blow box 10
(13) closing flap in the gas feed line 12
(14) channel/nozzle web of the blow box 10
(15) transport system for glass panes
(16) frame form for glass panes
(b) width of the merlon-like elevation 3
(h) height of the merlon-like elevation 3
(t) depth of the merlon-like elevation 3
(a) distance between adjacent elevations 3
(I) glass pane
SL chord length
KT depth of curvature

The invention claimed is:

1. A nozzle strip for a blow box for thermally prestressing glass panes, which nozzle strip has a row of nozzles each having a nozzle inlet and a nozzle opening for impinging on a surface of a glass pane with a stream of air through the nozzle openings, wherein, along said row of nozzles, the nozzle openings are arranged on merlon-like elevations of a side surface of the nozzle strip, which are implemented integrally with the nozzle strip, wherein, along said row of nozzles, the merlon-like elevations are curved at least in regions such that the side surface of the nozzle strip with the merlon-like elevations has no planar sections, wherein, along said row of nozzles, the merlon-like elevations have a wave-like profile such that the nozzle openings are arranged on wave peaks and crenels between the adjacent elevations are defined by the wave troughs, wherein, along said row of nozzles, each surface portion of the side surface of the nozzle strip that extends between, and connects, two adjacent wave peaks defines a hollow space that forms an outflow gas channel between said two adjacent wave peaks, the wave-like profile including first, second and third wave peaks and first and second wave troughs, the first wave trough forming a first crenel between the first and second wave peak that are adjacent to each other and the second wave trough forming a second crenel between the second and the third wave peak that are adjacent to each other, wherein a first hollow space forming a first outflow gas channel is defined by a first surface portion of the side surface of the nozzle strip that extends from the first wave peak to the second wave peak via the first crenel, said first surface portion having no planar sections, wherein a second hollow space forming a second outflow gas channel is defined by a second surface portion of the side surface of the nozzle strip that extends from the second wave peak to the third wave peak via the second crenel, said second surface portion having no planar sections, and wherein each merlon-like elevation of the wave-like profile has one wave peak with the nozzle opening in a central position of the wave peak.

2. The nozzle strip according to claim 1, wherein the nozzle openings are arranged at a mutual distance of 10 mm to 50 mm.

3. The nozzle strip according to claim 1, wherein the nozzle openings have a diameter of 4 mm to 15 mm.

4. The nozzle strip according to claim 3, wherein the nozzle opening s have a diameter of 5 mm to 10 mm.

5. The nozzle strip according to claim 1, wherein a height of the elevations is from 10 mm to 150 mm.

6. The nozzle strip according to claim 5, wherein the height is from 30 mm to 100 mm.

7. The nozzle strip according to claim 1, wherein a width of the elevations corresponds at least to a diameter of the nozzle openings plus 3 mm.

8. The nozzle strip according to claim 1, wherein the distance between adjacent elevations is at least 5 mm.

9. The nozzle strip according to claim 8, wherein the distance between adjacent elevations is at least 10 mm.

10. The nozzle strip according to claim 1, wherein the nozzles have a section tapered in a direction from the nozzle inlet to the nozzle opening.

11. The nozzle strip according to claim 1, wherein the nozzle strip contains aluminum or steel.

12. A blow box for thermally prestressing glass panes, comprising a hollow space, a gas feed line connected to the hollow space, and a row of channels connected to the hollow space, wherein at least one channel opposite the hollow space is completed with a nozzle strip that has a row of nozzles each having a nozzle inlet and a nozzle opening for impinging on a surface of a glass pane with a stream of air through the nozzle openings, wherein, along said row of nozzles, the nozzle openings are arranged on merlon-like elevations of a side surface of the nozzle strip, which are implemented integrally with the nozzle strip, wherein, along said row of nozzles, the merlon-like elevations are curved at least in regions such that the side surface of the nozzle strip with the merlon-like elevations has no planar sections, wherein, along said row of nozzles, the merlon-like elevations have a wave-like profile such that the nozzle openings are arranged on wave peaks and crenels between the adjacent elevations are defined by the wave troughs, wherein, along said row of nozzles, each surface portion of the side surface of the nozzle strip that extends between, and connects, two adjacent wave peaks defines a hollow space that forms an outflow gas channel between said two adjacent wave peaks, the wave-like profile including first, second and third wave peaks and first and second wave troughs, the first wave trough forming a first crenel between the first and second wave peak that are adjacent to each other and the second wave trough forming a second crenel between the second and the third wave peak that are adjacent to each other, wherein a first hollow space forming a first outflow gas channel is defined by a first surface portion of the side surface of the nozzle strip that extends from the first wave peak to the second wave peak via the first crenel, said first surface portion having no planar sections, wherein a second hollow space forming a second outflow gas channel is defined by a second surface portion of the side surface of the nozzle strip that extends from the second wave peak to the third wave peak via the second crenel, said second surface portion having no planar sections, and wherein each merlon-like elevation of the wave-like profile has one wave peak with the nozzle opening in a central position of the wave peak.

13. An apparatus for thermally prestressing glass panes, comprising:

a first blow box and a second blow box that are arranged opposite one another such that nozzle openings of the first blow box and of the second blow box face one another, wherein the first blow box and/or the second blow box is equipped with at least one nozzle strip, and a system for moving a glass pane into an intermediate space between the first blow box and the second blow box, wherein the at least one nozzle strip has a row of nozzles each having a nozzle inlet and a nozzle opening for impinging on a surface of a glass pane with a stream of air through the nozzle openings, wherein, along said row of nozzles, the nozzle openings are arranged on merlon-like elevations of a side surface of the nozzle strip, which are implemented integrally with the nozzle strip, wherein, along said row of nozzles, the merlon-like elevations are curved at least in regions such that the side surface of the nozzle strip with the merlon-like elevations has no planar sections, wherein, along said row of nozzles, the merlon-like elevations have a wave-like profile such that the nozzle openings are arranged on wave peaks and crenels between the adjacent elevations are defined by the wave troughs, wherein, along said row of nozzles, each surface portion of the side surface of the nozzle strip that extends between, and connects, two adjacent wave peaks defines a hollow space that forms an outflow gas channel between said two adjacent wave peaks, the wave-like profile including first, second and third wave peaks and first and second wave troughs, the first wave trough forming a first crenel between the first and second wave peak that are adjacent to each other and the second wave trough forming a second crenel between the second and the third wave peak that are adjacent to each other, wherein a first hollow space forming a first outflow gas channel is defined by a first surface portion of the side surface of the nozzle strip that extends from the first wave peak to the second wave peak via the first crenel, said first surface portion having no planar sections, wherein a second hollow space forming a second outflow gas channel is defined by a second surface portion of the side surface of the nozzle strip that extends from the second wave peak to the third wave peak via the second crenel, said second surface portion having no planar sections, and wherein each merlon-like elevation of the wave-like profile has one wave peak with the nozzle opening in a central position of the wave peak.

14. A method for thermally prestressing a glass pane, comprising:
   (a) arranging a heated glass pane having two primary surfaces and a peripheral side edge areally between a first blow box and a second blow box such that the two primary surfaces are impingeable on by a stream of gas, wherein the first blow box and/or the second blow box is equipped with at least one nozzle strip, and
   (b) impinging the two primary surfaces of the glass pane with a stream of gas by the first and second blow boxes such that the glass pane is cooled,
   wherein the at least one nozzle strip has a row of nozzles each having a nozzle inlet and a nozzle opening for impinging on a surface of a glass pane with a stream of air through the nozzle openings, wherein, along said row of nozzles, the nozzle openings are arranged on merlon-like elevations of a side surface of the nozzle strip, which are implemented integrally with the nozzle strip,
   wherein, along said row of nozzles, the merlon-like elevations are curved at least in regions such that the side surface of the nozzle strip with the merlon-like elevations has no planar sections, wherein, along said row of nozzles, the merlon-like elevations have a wave-like profile such that the nozzle openings are arranged on wave peaks and crenels between the adjacent elevations are defined by the wave troughs, wherein, along said row of nozzles, each surface portion of the side surface of the nozzle strip that extends between, and connects, two adjacent wave peaks defines a hollow space that forms an outflow gas channel between said two adjacent wave peaks, the wave-like profile including first, second and third wave peaks and first and second wave troughs, the first wave trough forming a first crenel between the first and second wave peak that are adjacent to each other and the second wave trough forming a second crenel between the second and the third wave peak that are adjacent to each other, wherein a first hollow space forming a first outflow gas channel is defined by a first surface portion of the side surface of the nozzle strip that extends from the first wave peak to the second wave peak via the first crenel, said first surface portion having no planar sections, wherein a second hollow space forming a second outflow gas channel is defined by a second surface portion of the side surface of the nozzle strip that extends from the second wave peak to the third wave peak via the second crenel, said second surface portion having no planar sections, and wherein each merlon-like elevation of the wave-like profile has one wave peak with the nozzle opening in a central position of the wave peak.

15. The method according to claim 14, wherein the glass pane has, in a direction of curvature perpendicular to a direction of extension of the at least one nozzle strip, a bending gradient $$BG = \frac{100 \times KT}{0.5 \times SL}$$

of at least 5, where SL is the chord length of the glass pane and KT is the depth of curvature.

16. A method comprising arranging a glass pane prestressed by the method according to claim 14 in a vehicle of transport for travel on land, in the air, or on water.

17. The method according to claim 16, wherein the glass pane is a window pane in a rail vehicle or a motor vehicle.

18. The method according to claim 16, wherein the glass pane is a rear window, a side window, or a roof panel of passenger car.

* * * * *